United States Patent
Kraeling et al.

(10) Patent No.: US 10,798,282 B2
(45) Date of Patent: Oct. 6, 2020

(54) MINING DETECTION SYSTEM AND METHOD

(71) Applicant: GE Global Sourcing LLC, Norwalk, CT (US)

(72) Inventors: Mark Bradshaw Kraeling, Melbourne, FL (US); Glenn Robert Shaffer, Erie, PA (US); Emad Andarawis Andarawis, Ballston Lake, NY (US); Glen William Brooksby, Glenville, NY (US); Christopher Gushee, Marietta, GA (US); Jeffrey Mayton, Winnabow, NC (US); Cheng-Po Chen, Niskayuna, NY (US); Nancy Cecelia Stoffel, Schenectady, NY (US); Wyatt Smith, Media, PA (US); Jose Luis R. Virgen, Salt Lake City, UT (US); Daniel L. Olson, New Berlin, WI (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 0 days.

(21) Appl. No.: 16/229,305

(22) Filed: Dec. 21, 2018

(65) Prior Publication Data
US 2019/0149715 A1    May 16, 2019

Related U.S. Application Data

(60) Continuation-in-part of application No. 15/913,434, filed on Mar. 6, 2018, now Pat. No. 10,488,174, (Continued)

(51) Int. Cl.
*H04N 5/232* (2006.01)
*B60R 1/00* (2006.01)
(Continued)

(52) U.S. Cl.
CPC ......... *H04N 5/23203* (2013.01); *B60R 1/002* (2013.01); *G08B 21/02* (2013.01);
(Continued)

(58) Field of Classification Search
CPC ................. H04N 5/23203; H04N 1/00; H04N 5/232411; H04N 5/23206; H04N 7/185;
(Continued)

(56) References Cited

U.S. PATENT DOCUMENTS 7,483,727 B2 * 1/2009 Zhu ..................... H04M 1/0202
                                                          330/129
8,575,942 B2 * 11/2013 Dorr ..................... G01R 29/08
                                                          324/326

(Continued)

FOREIGN PATENT DOCUMENTS

CN        1802678 A    7/2006
CN      101180803 A    5/2008
(Continued)

OTHER PUBLICATIONS

Second Examination Report dated Sep. 9, 2019 for corresponding AU Application No. 2015217535.
(Continued)

*Primary Examiner* — Brian Wilson
(74) *Attorney, Agent, or Firm* — John P. Darling; The Small Patent Law Group, LLC (57) ABSTRACT

A device for detecting proximity to an active alternating current (AC) voltage source is provided. The device includes a housing, at least one antenna configured to generate a signal in response to exposure to electromagnetic radiation, signal processing circuitry configured to process the signal generated by the at least one antenna, a microprocessor configured to determine, from the processed signal, whether the alert device is proximate to the active AC voltage source,
(Continued)

a communication device configured to generate a signal in response to a determination that the alert device is proximate the active AC voltage source, and an interference reduction device configured to discharge an accumulated charge on the alert device to reduce electromagnetic interference from sources other than the active AC voltage source.

18 Claims, 7 Drawing Sheets

Related U.S. Application Data which is a continuation-in-part of application No. 16/136,423, filed on Sep. 20, 2018, which is a division of application No. 14/541,370, filed on Nov. 14, 2014, now Pat. No. 10,110,795, which is a continuation-in-part of application No. 14/485,398, filed on Sep. 12, 2014, now Pat. No. 10,049,298, and a continuation-in-part of application No. 14/457,353, filed on Aug. 12, 2014, and a continuation-in-part of application No. 14/253,294, filed on Apr. 15, 2014, now Pat. No. 9,875,414, and a continuation-in-part of application No. 14/217,672, filed on Mar. 18, 2014, and a continuation-in-part of application No. 14/479,847, filed on Sep. 8, 2014, now abandoned, which is a continuation of application No. 14/217,672, filed on Mar. 18, 2014, said application No. 14/541,370 is a continuation-in-part of application No. 13/109,209, filed on May 17, 2011, now Pat. No. 8,913,131, which is a division of application No. 11/146,831, filed on Jun. 6, 2005, now Pat. No. 7,965,312, which is a continuation-in-part of application No. 10/361,968, filed on Feb. 10, 2003, now abandoned.

(60) Provisional application No. 61/940,696, filed on Feb. 17, 2014, provisional application No. 61/940,660, filed on Feb. 17, 2014, provisional application No. 61/940,610, filed on Feb. 17, 2014, provisional application No. 61/940,813, filed on Feb. 17, 2014, provisional application No. 60/626,573, filed on Nov. 10, 2004, provisional application No. 60/385,645, filed on Jun. 4, 2002.

(51) Int. Cl.
*H04N 1/00* (2006.01)
*G08B 23/00* (2006.01)
*G08B 21/02* (2006.01)
*G08B 21/14* (2006.01)
*G08B 25/00* (2006.01)
*H04N 7/18* (2006.01)

(52) U.S. Cl.
CPC .............. *G08B 21/14* (2013.01); *G08B 23/00* (2013.01); *G08B 25/00* (2013.01); *H04N 1/00* (2013.01); *H04N 5/23206* (2013.01); *H04N 5/232411* (2018.08); *H04N 7/185* (2013.01)

(58) Field of Classification Search
CPC ........ G08B 25/00; G08B 21/14; G08B 21/02; G08B 23/00; B60R 1/002
See application file for complete search history.

(56) References Cited

U.S. PATENT DOCUMENTS

| | | | |
|---|---|---|---|
| 9,548,773 B1* | 1/2017 | Cadigan | H04B 1/0475 |
| 2006/0132602 A1 | 6/2006 | Muto et al. | |
| 2007/0005202 A1 | 1/2007 | Breed | |
| 2007/0027583 A1 | 2/2007 | Tamir | |
| 2008/0128563 A1 | 6/2008 | Kumar et al. | |
| 2009/0115603 A1* | 5/2009 | Tabe | A61B 5/6804 340/540 |
| 2011/0216200 A1 | 9/2011 | Chung | |
| 2012/0140077 A1 | 6/2012 | Muto et al. | |
| 2012/0176500 A1 | 6/2012 | Muto et al. | |
| 2014/0077961 A1* | 3/2014 | Frederick | G08B 13/1427 340/686.6 |
| 2014/0111208 A1* | 4/2014 | Olsson | G01V 3/10 324/329 |
| 2014/0151512 A1 | 6/2014 | Cooper et al. | |
| 2014/0313333 A1 | 10/2014 | Le et al. | |
| 2016/0106174 A1* | 4/2016 | Chung | A42B 3/0433 340/539.13 |
| 2017/0173262 A1 | 6/2017 | Veltz | |
| 2017/0350557 A1* | 12/2017 | Hakins | G08B 5/36 |
| 2020/0007741 A1 | 1/2020 | Johnson et al. | |

FOREIGN PATENT DOCUMENTS

| | | |
|---|---|---|
| CN | 102436738 A | 5/2012 |
| CN | 103416050 A | 11/2013 |
| CN | 104112127 A | 10/2014 |
| EP | 0953491 A1 | 3/1999 |
| JP | 2008247154 A | 10/2008 |
| KR | 20130119633 A | 11/2013 |
| KR | 20140017735 A | 2/2014 |
| WO | 2012150591 A2 | 11/2012 |

OTHER PUBLICATIONS

Office Action dated Sep. 9, 2019 for corresponding JP Application No. 2015-173383.
English Translation of the Office Action dated Sep. 9, 2019 for corresponding JP Application No. 2015-173383.
First Examination Report for corresponding AU Application No. 2015217535 dated Jun. 5, 2019 (3 pages).
Examination report No. 4 for AU application 2015217470 dated Apr. 18, 2018 (4 pages).
Examination report No. 1 for AU application 2018202825 dated Aug. 15, 2019 (5 pages).
Machine translated the previously cited Korean Patent Document 2014-0017735 which was published on Feb. 12, 2014. (18 pages).
Second Examination Report dated Nov. 1, 2019 for corresponding AU Application No. 2018202825.
Examination Report for corresponding AU Application No. 2015217536 dated Mar. 14, 2019 (3 pages).
Second Office Action issued in connection with corresponding CN Application No. 201580020130.4 dated Apr. 16, 2019.
First Office Action issued in connection with corresponding CN Application No. 201580020135.7 dated Jan. 29, 2019.
First Office Action and Search issued in connection with corresponding CN Application No. 201580020130.4 dated Nov. 13, 2018.
Final Office Action dated Dec. 17, 2019 for Japanese Application No. 2015-173383.
Examination Report dated Feb. 11, 2020 for Australian Application No. 2018202825.
Fourth Examination Report dated Apr. 17, 2020 for corresponding Australian patent application No. 2018202825 (4 pages).
Fifth Examination Report dated Jul. 13, 2020 for corresponding Australian patent application No. 2018202825.

* cited by examiner

MINING DETECTION SYSTEM AND METHOD

CROSS REFERENCE TO RELATED APPLICATIONS

This is a continuation-in-part of U.S. patent application Ser. No. 15/913,434, filed on 6 Mar. 2018 (now U.S. Pat. No. 10,488,174) and is a continuation-in-part of U.S. patent application Ser. No. 16/136,423, filed on 20 Sep. 2018 (the "'423 application").

The '423 application is a divisional of U.S. application Ser. No. 14/541,370, filed 14 Nov. 2014 (now U.S. Pat. No. 10,110,795) (the "'370 application").

The '370 application claims priority to U.S. Provisional Application Nos. 61/940,813; 61/940,660; 61/940,610; and 61/940,696, all of which were filed on 17 Feb. 2014; and is a continuation-in-part of: U.S. patent application Ser. No. 14/217,672, filed 18 Mar. 2014 (the "'672 application"); U.S. patent application Ser. No. 14/253,294, filed 15 Apr. 2014 (now U.S. Pat. No. 9,875,414) (the "'294 application"); U.S. patent application Ser. No. 14/457,353, filed 12 Aug. 2014 (the "'353 application"); U.S. patent application Ser. No. 14/479,847, filed 8 Sep. 2014 (now abandoned) (the "'847 application"); U.S. patent application Ser. No. 14/485,398 filed 12 Sep. 2014 (now U.S. Pat. No. 10,049,298) (the "'398 application"); and U.S. patent application Ser. No. 13/109,209, filed 17 May 2011 (now U.S. Pat. No. 8,913,131) (the "'209 application").

The '353 application and the '398 application each claim priority to U.S. Provisional Application Nos. 61/940,813; 61/940,660; 61/940,610; and 61/940,696 filed 17 Feb. 2014.

The '209 application is a divisional application of U.S. patent application Ser. No. 11/146,831, filed on 6 Jun. 2005 (now U.S. Pat. No. 7,965,312) (the "'831 application"), which claims priority to U.S. Provisional Application No. 60/626,573, filed on 10 Nov. 2004 (the "'573 application") and is a continuation-in-part of U.S. patent application Ser. No. 10/361,968, filed 10 Feb. 2003 (now abandoned) (the "'968 application").

The '968 application claims priority to U.S. Provisional Application No. 60/385,645, filed 4 Jun. 2002 (the "'645 application").

The '847 application is a continuation-in-part of the '672 application.

The entire disclosures of all these applications are incorporated herein by reference, including the drawings, for all purposes.

BACKGROUND

Technical Field

The subject matter described herein relates to detection devices and methods.

Discussion of Art

At least some known detection devices are wearable devices. Design constraints for wearable devices appear to seek a physically thin, unobtrusive and low profile. Some detection devices may be used to sense voltage or the presence of noxious material.

Existing voltage sensing devices are used to detect active voltage sources within a determined distance of the device. At least some known voltage sensing devices must be intentionally activated by a user (i.e., they are not passive, automatic sensing devices). In addition to manual activation, they have a relatively limited range. When an active voltage source is detected an alarm sounds, and this alarm emits at least some electromagnetic interference. The electromagnetic interference may affect the sensor input element, and this may impact the ability of the voltage sensing device to accurately detect active voltage sources. Further, at least some known voltage sensing devices include a housing made of an electrically insulative material, such as silicone rubber. When the housing contacts another object, an electric charge may accumulate on the housing. This accumulated electric charge may interfere with the voltage sensing device.

Many sensing input elements for detecting noxious elements are bulky, use wet chemistry, or require sophisticated equipment (such as gas chromatography and atomic absorption spectroscopy). These devices detect chemicals in liquid or gas form that a person may not want to contact, inhale or ingest. These substances may be organic or metallic, and/or may be radioactive (e.g., Radon gas). The detectors may be hand held, such as a Geiger counter, or may be a wearable coupon (such as a color changing strip). Dosimeters may collect data about discrete exposures to radiation levels. Sensing input elements may have false positives based on environmental interference. For example, gas analyzers may not be able to distinguish analytes of interest from nuisance gas species, and radiation detectors may mistake one form of radiation for another.

It may be desirable to have a detection device and method that differs from those that are currently available.

BRIEF DESCRIPTION

In one aspect, a detection device for detecting proximity to an active alternating current (AC) voltage source is provided. The device includes a housing sized and shaped to be worn by a user, at least one antenna embedded in the housing, the at least one antenna configured to generate a signal in response to exposure to electromagnetic radiation, signal processing circuitry embedded in the housing and communicatively coupled to the at least one antenna, the signal processing circuitry configured to process the signal generated by the at least one antenna, a microprocessor embedded in the housing and communicatively coupled to the signal processing circuitry, the microprocessor configured to determine, from the processed signal, whether the voltage detection device is proximate to the active AC voltage source, an alert device embedded in the housing and communicatively coupled to the microprocessor, the alert device configured to generate an alert in response to a determination that the voltage detection device is proximate the active AC voltage source, and an interference reduction device embedded in the housing and communicatively coupled to the microprocessor, the interference reduction device configured to discharge an accumulated charge on the voltage detection device to reduce electromagnetic interference from sources other than the active AC voltage source.

In one aspect, a detection system is provided that includes a housing, a sensing first circuit, a communication device, and an interference second circuit. The housing may be worn by a user or carried on a mobile device. At least one sensing first circuit is selectively coupled to the housing and can sense or detect one or more of electromagnetic radiation, ionizing radiation, a determined liquid analyte, a determined gaseous analyte, a determined powdered analyte concentration, a level of oxygen below a determine threshold value, a data signal strength, a determined level of magnetic flux, a temperature, and a pressure. The at least one communication device can generate and/or communicate a signal in response to the sensing or detecting by the sensing circuit. The interference second circuit can reduce or eliminate interference by the sensing first circuit.

In another aspect, a method for detecting proximity of a voltage detection device to an active alternating current (AC) voltage source is provided. The voltage detection device includes a housing sized and shaped to be worn by a user. The method includes generating, using at least one antenna embedded in the housing, a signal in response to exposure to electromagnetic radiation, processing the generated signal using signal processing circuitry embedded in the housing and communicatively coupled to the at least one antenna, determining, using a microprocessor embedded in the housing and communicatively coupled to the signal processing circuitry, based on the processed signal, whether the voltage detection device is proximate to the active AC voltage source, generating, using an alert device embedded in the housing and communicatively coupled to the microprocessor, an alert in response to a determination that the voltage detection device is proximate the active AC voltage source, and discharging, using an interference reduction device embedded in the housing and communicatively coupled to the microprocessor, an accumulated charge on the voltage detection device to reduce electromagnetic interference from sources other than the active AC voltage source.

In one aspect, a method includes collecting one or more hazardous or sub-hazardous readings. The hazardous or sub-hazardous readings are compared to an associated set of determined threshold values. If the one or more hazardous or sub-hazardous readings exceed at least one of the determined threshold values, the method responds by dispatching maintenance and service workers to a location where the one or more hazardous or sub-hazardous readings were generated to identify and address a cause of the one or more hazardous or sub-hazardous readings; generating a heat map of the one or more hazardous or sub-hazardous readings; and monitoring locations and/or vectors of a plurality of users. If any one of such plurality of users moves within a determined distance of the area of the heat map, the method continues by one or more of: dispatching emergency medical and/or hazardous material teams to a location of such users; and alerting such users that a possibility of a hazardous condition exists; and monitoring such user's vital signs for a change that could indicate distress of such individual; and changing an operation associated with the cause of the one or more hazardous or sub-hazardous readings. Changing the operation may include one or more of switching a lock condition of a door that leads to or from a location corresponding to the area of the heat map; initiating a ventilation system to seal the location; initiating a ventilation system to ventilate the location; de-energizing a circuit in the location; and/or initiating a fire suppression system at the location.

DRAWINGS

These and other features and aspects of the disclosure may be read with the detailed description, and like characters represent like parts throughout the drawings, wherein.

DETAILED DESCRIPTION

The subject matter described herein relates to detection devices and methods. In one embodiment, a wearable voltage detection device detects proximity to active voltage sources and alerts accordingly.

Figure 1:
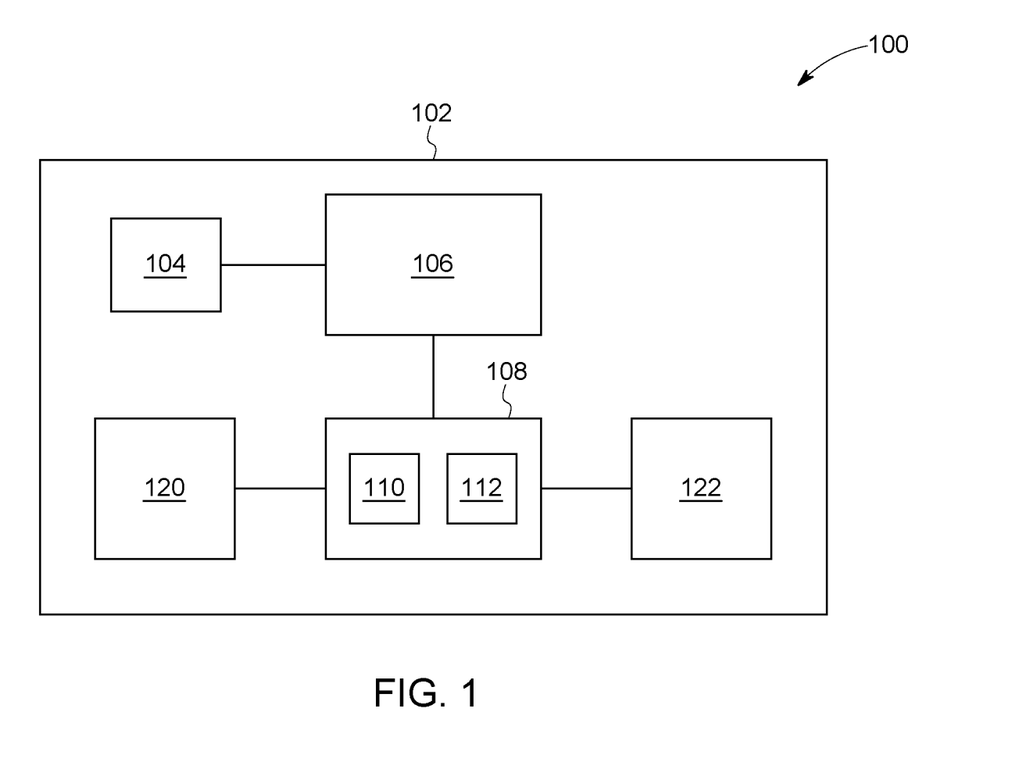
FIG. 1 is a block diagram of an exemplary voltage detection device.

With reference to FIG. 1, a block diagram of an alert device 100 that includes features and aspects of the invention is shown. The voltage detection device may include a housing 102 containing a plurality of components, as described in detail below. At least one antenna 104 may be coupled to the housing. The antenna may be communicatively coupled to signal processing circuitry 106 that may be also couple to the housing. The alert device may be communicatively coupled to a microprocessor or controller 108 that includes a memory device 110 and a processor 112 coupled to the memory device. The alert device may include one or more user and/or hazard sensors 120 embedded in the housing. The controller may be communicatively coupled to the signal processing circuitry. In some embodiments, the alert device may include an interference reduction device 122.

The alert device 100 may represent or be included in a detection system that detects one or more hazardous environments (as described herein) and warns the wearer or holder of the alert device 100. For example, the alert device 100 can be worn or carried by a user in a mine, in a building, or the like, to warn the user when he or she comes into close proximity of an active source of AC.

The illustrated alert device may be wearable by a user and may facilitate detecting a hazardous condition located near the user or current state of the user. A user sensor may monitor and/or detect a condition of the user that is wearing such an alert device. A hazard sensor package may detect the hazardous condition. The alert device may respond to such detection by logging the event, noting the location, warning the user, and/or communicating hazard information to a backend system that may perform further actions based thereon.

An example of a hazardous condition may be that an active voltage source (e.g., a current carrying wire) is nearby. A suitable alert device may detect voltages in a range greater than about 50 volts. In one embodiment, the voltage detector may detect voltages in a range of from about 50 to about 1000 VAC. In other embodiments, the alert device may be capable of detecting another range of voltages that enables the alert device to function as described herein. The voltage detection may be direct current (DC), alternating current (AC), or both.

Although the alert device may be described herein as detecting the presence of an active AC voltage source, the alert device may include other or additional hazard sensors for detecting other phenomena. For example, the alert device may include temperature detection or chemical detection sensors. Other suitable sensors may include one or more magnetometers, force sensors, temperature sensors, chemical and/or gas sensors, optical sensors (e.g., camera and/or fiber optic), impedance and/or resistance sensors, acoustic sensors (i.e., microphone), locations sensors (e.g., global positioning sensor/GPS and/or relative location, such as proximity to a beacon) and may be selected based on application specific criteria Returning to an example alert device that may detect voltage sources, in one embodiment that detection may be within a determined distance range of the alert device and/or also within an angular range of the alert device. In the exemplary embodiment, the distance range of the alert device is about 1 meter (i.e., the alert device may detect voltage sources up to 1 meter from the alert device). Further, in the exemplary embodiment, the alert device has a substantially omnidirectional angular range. That is, the alert device may detect voltage sources in substantially any direction relative to the alert device. Alternatively, the alert device may have a distance range and angular range that enables the alert device to function as described hereinbelow such that the angular range may be limited to a narrow band, and if coupled to another like sensor at a perpendicular orientation it may be possible for the device to not only detect the hazardous condition but also to indicate a general direction relative to the device.

In one embodiment, the alert device may be a passive device that does not require the user to intentionally activate the alert device or provide input to the alert device to initiate detection. Instead, the alert device automatically monitors for and detects voltage sources and alerts the user to those detections. Alternatively, the alert device may be an active device that requires user input to initiate detection.

To reduce or eliminate charge build-up on the alert device having a voltage sensor, the housing may be fabricated from an electrically dissipative material. A suitable electrically dissipative material may have a polymeric base and a conductive filler. In another embodiment, the electrically dissipative material may be inherently conductive without the use of a filler. Suitable intrinsically conductive polymers may include one or more of polyanilines, polypyrrols and polythiophenes. For filled electrically conductive materials, a suitable polymeric base may be polyurethane, nylon, rubber, or another plastic selected based on application specific criteria. Suitable filler material may include carbon, metal and the like. A suitable electrically dissipative material may have a resistivity in a range of less than about $1\times10^8$ ohm centimeters ($\Omega\cdot$cm), or in a range of from approximately $1\times10^8$ ohm centimeters ($\Omega\cdot$cm) to about $1\times10^{10}$ $\Omega\cdot$cm, or in a range of greater than about $1\times10^{10}$ $\Omega\cdot$cm. A lower resistivity (e.g., $1\times10^6$ $\Omega\cdot$cm) may reduce detection sensitivity of the alert device. The type of electrically dissipative material may be determined at least in part by the parameters of the end use application.

Figure 2:
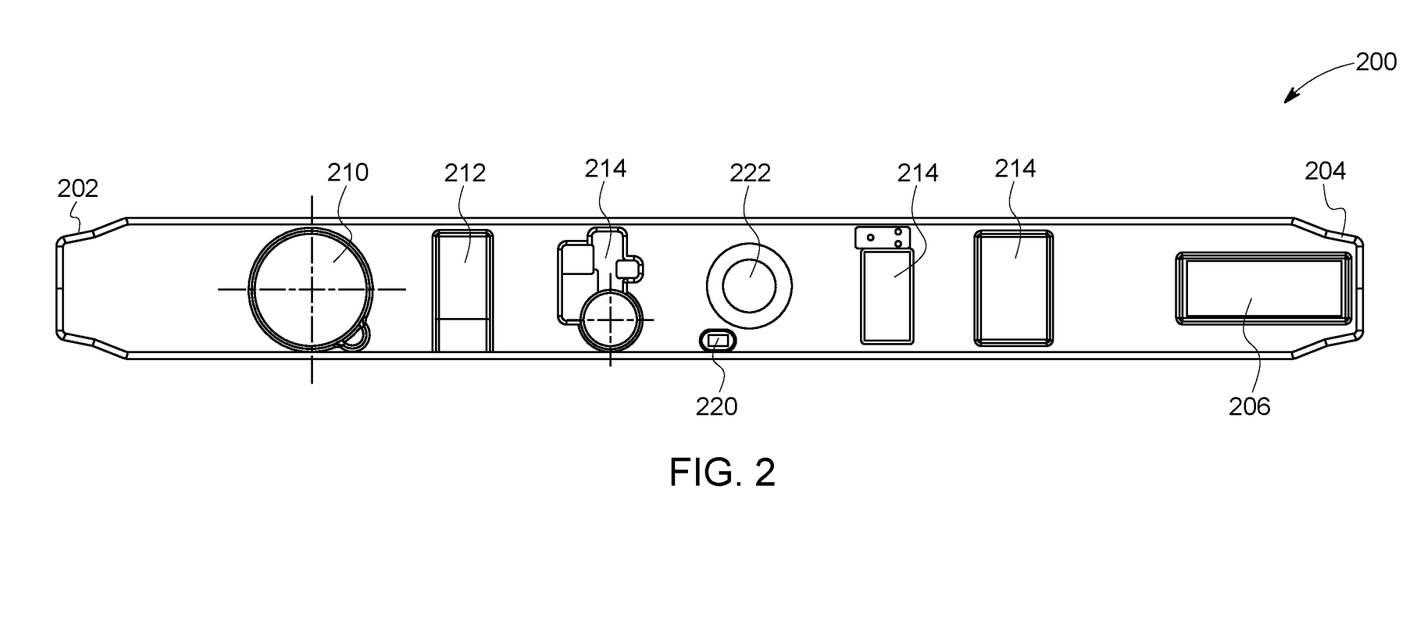
FIG. 2 is a schematic diagram of an exemplary wristband that may constitute the voltage detection device shown in FIG. 1.
Figure 3:
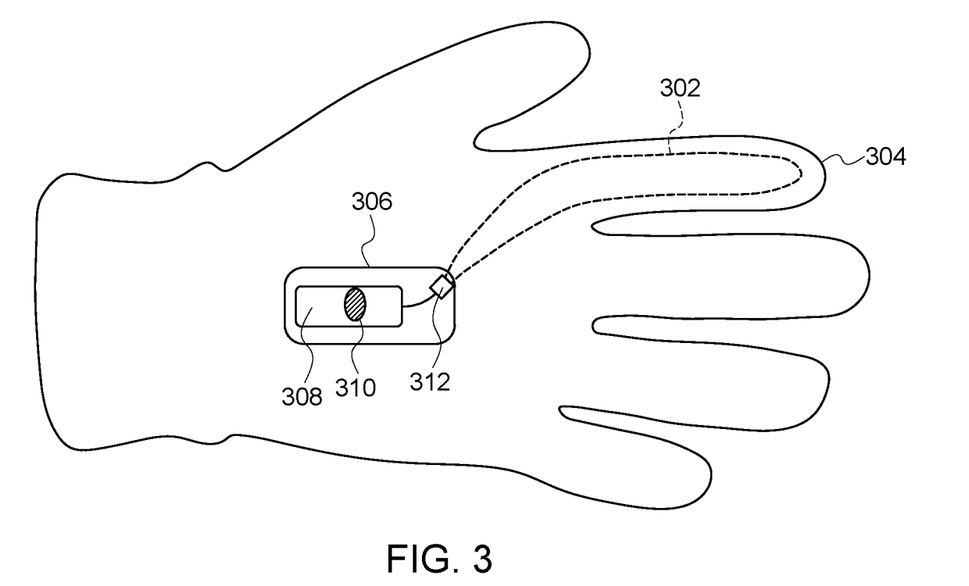
FIG. 3 is a schematic diagram of an exemplary glove that may constitute the voltage detection device shown in FIG. 1.

The housing may be sized and shaped to be worn by a user. For example, the housing may form a wristband (as shown in FIG. 2) or a glove (as shown in FIG. 3). Other suitable configurations for the housing may include a modular design (not shown) that is attachable to a variety of gear having a fastener that accepts the form and fit of the housing. In some applications, the fastener may simply be a Velcro-like system. In other applications, the housing may be securable with a lanyard, a clip, or in a pocket. In one embodiment, the housing may be water-resistant and/or submersible.

During operation, the antenna may generate a signal in response to exposure to electromagnetic radiation (e.g., generated by a voltage source). A suitable antenna may be, for example, a loop of wire. In other embodiments, the antenna may have a configuration that enables the alert device to function as described herein. Another suitable antenna may be printed on an inherently static dissipative material, such as thermoplastic polyurethane (TPU). Alternatively, the antenna may have a segmented antenna structure with individual sense channels. That is, multiple antennae may be used.

The signal processing circuitry may receive and process the signal generated by the antenna. For example, the signal processing circuitry may perform filtering and/or amplification on the signal generated by the antenna. Different voltage sources may have different signatures. In one embodiment that can detect an AC voltage source, the signal generated by the antenna in response to its exposure to the active AC voltage source may have a frequency in a range from about 50 Hertz (Hz) to about 60 Hz. the signal processing circuitry may filter out signal components outside of a similar range (that is, from approximately 50 Hz to 60 Hz) such that signal components that may not indicate an active AC voltage source are removed. The signal processing circuitry may identify and filter out known noise signatures (e.g., fluorescent lights, welding equipment, motor starters, and the like).

The controller determines, from the processed signal generated by the signal processing circuitry, whether the alert device may be proximate to an active AC voltage source. The controller may make this determination continuously or periodically (i.e., at a determined sampling rate). Further, the sampling rate may be dynamically adjusted (e.g., to reduce power consumption, improve detection, and the like) during operation.

The processor may include one or more processing units, such as a multi-core configuration. Executable instructions may be stored in the memory device. The controller may perform one or more operations described herein by programming the processor. For example, the processor may be programmed by encoding an operation as one or more executable instructions and providing the executable instructions in the memory device. In the exemplary embodiment, the memory device may be one or more devices that enable storage and retrieval of information such as executable instructions or other data. The memory device may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. In one embodiment, the controller may include a wireless communications interface for transmitting data from the alert device to a remote computing device for storage and/or analysis. The remote device may be proximate (such as a communication with a smart phone, tablet or other personal computing device) or may be distant (such as a backend computer system in a cloud server arrangement). The location of the controller may be selected based on application specific parameters, to include power consumption, environmental interference, distance to receivers, and the like.

If the controller determines that the alert device may be proximate to, that is, within a determined distance of, an active voltage source, the controller causes the alert device to generate an alert or signal. Depending on the use case and application, the generated signal may be one or more of an audio, visual, and/or haptic/tactile signal that makes a user aware that the alert device may be near to an active voltage source. For example, the signal may include a blinking light, a color-changing light, an audible signal (e.g., a beeping sound or siren sound), or a vibration.

In one embodiment, the alert device may include a housing, an antenna, signal processing circuitry, and microprocessor to facilitate detecting active voltage sources. The alert device may include a shunt, a grounding circuit, or an interference reduction device (collectively referred to as an interference reduction device) to reduce or eliminate electromagnetic interference (EMI) from sources other than active AC voltage sources. In addition, the alert device may leverage particular materials and processing components to reduce or eliminate interference signals, improving the ability of the alert device to detect active AC voltage sources.

During use, electrical charge may accumulate on the alert device. The interference reduction device can discharge accumulated charge on the alert device. This accumulated electrical charge may cause electromagnetic interference that impedes the ability of the alert device to accurately detect the presence of an active AC voltage source. For example, accumulated electrical charge may cause the alert device to generate a false alarm when no active AV voltage source may be present.

In one embodiment, the interference reduction device may be operable to reduce electromagnetic interference generated by other, external sources of electromagnetic radiation. The interference reduction device may discharge any accumulated charge after a determined period of time (e.g., after a determined number of cycles of a signal generated by the communication device) and/or after certain conditions may be satisfied (e.g., after an accumulated charge on the alert device reaches a threshold value level). Accordingly, after the interference reduction device discharges any accumulated charge, the alert device can again attempt to detect (without interference from the accumulated charge) the presence of an active AC voltage source.

With reference to FIG. 2, an exemplary wristband 200 is shown that acts as a housing that supports an alert device. The wristband may be flexible and may be sized and shaped to be worn on a wrist of a user. The wristband extends between a first end 202 and an opposite second end 204. Further, the wristband may include a coupling mechanism 206 for coupling the first end to the second end (i.e., such that the wristband forms a loop that encircles the user's wrist). The coupling mechanism may be a hook and loop fastener. In other embodiments, the coupler may be a magnetic fastener, a snap-fit fastener, or other suitable coupling device.

The wristband may include an energy source 210. In one embodiment, the energy source is a rechargeable battery that may be recharged via a charging port 212 (e.g., a micro USB charging port). Other suitable energy sources may include a motion driven generator, a solar cell, a hydrogen cell, and the like. The wristband may include a plurality of electronics components 214 that may include, for example, an antenna, signal processing circuitry, controller, communication device, location/locator device, and/or an interference reduction device (as shown in FIG. 1). In one embodiment, the antenna may be a conductive loop that extends between first and second ends.

A suitable communication device may be a light-emitting diode (LED) 220, as shown in FIG. 2. LED may function as a communication device (e.g., by generating visual signals) and/or may be used to indicate, for example, a charge status or power level of wristband. In the exemplary embodiment, the wristband may support a user input device 222 (e.g., a switch or buttons) that enables selectively activating one or more components of wristband. Using the user input device, the user may adjust sensitivity (e.g., adjust the detection range) of the wristband.

A user sensor package 224 may include one or more of a heart rate monitor, a blood oxygen content sensor, a blood alcohol sensor, a blood sugar sensor, a blood pressure sensor, a skin temperature sensor, a perspiration sensor, or another sensor based on application specific parameters. Suitable sensors for a device may be selected based on application specific parameters, including parameters specific to the user and/or the environment. If a user is known to have a health condition, such as diabetes, then the sensors may include a blood sugar monitor. If the user environment involves closed spaces, then a blood oxygen sensor may be included.

An environmental sensor package 226 may include one or more hazard sensors. Suitable hazard sensors may include one or more of an active AC voltage sensors, temperature detection or chemical detection sensors, magnetometers, force sensors, temperature sensors, chemical and/or gas sensors, optical sensors (e.g., camera and/or fiber optic), impedance and/or resistance sensors, acoustic sensors (i.e., microphone), locations sensors (e.g., global positioning sensor/GPS and/or relative location, such as proximity to a beacon) and these may be selected based on application specific criteria.

During use, the user sensor package may monitor a health condition of the user and do one or more of store such information, transmit such information, or analyze such information. If analysis is done on the device, designated threshold values may be compared to sensed parameters. If such sensed parameter values cross the designated threshold value, the device may respond by alerting the user, signaling a backend data system, or interacting with a related nearby system. For example, if the skin temperature sensor shows overheating of the user an overheating indicium may be provided to the user. This may prompt the user to reduce strenuous activity, move to a cooler environment, increase water intake, or the like. Prolonged exposure to the elevated temperature may cause the device to respond with additional and increasingly urgent indicia. On device analysis may occur by accumulating data over time. For example, radiation exposure may be cumulative. As such, the device may not only sense the amount and duration of radiation exposure but may accumulate and aggregate such exposure events and alert upon reaching a designated total accumulated radiation exposure level.

In one embodiment, the communication device communicates sensed data from the device to the backend system. The sensing first circuit may detect one or more hazardous or sub-hazardous readings, and the communication device may transmit those readings, and additional information, to the backend system. That is, location information from the locating device is provided with the sensed data. Time/date information is provided with the sensed data and the location information. The backend system analyzes the hazard information and other signals generated by the wristband device. Based at least in part on the analysis the backend system may warn other users (based on their locations) that they may be in or may be approaching an area where a hazard was indicated by the combination of the signal and the location. The warning may be general in nature or may indicated the type and severity of the hazard.

The reference to sub-hazardous refers to a reading that is atypical, but not necessarily hazardous to the user. For example, a camera or photovoltaic array may notice that ambient lighting is below a designated level, and enough readings have signaled the same in the same location that a false positive has been ruled as unlikely. In response, maintenance may be dispatched to see if a there are malfunctioning light bulbs that need attending.

Based at least in part on the analysis, the backend system may dispatch maintenance to an area when the signal indicates that a threshold value of one or more sensible attributes has been achieved or surpassed. As part of the analysis, the backend system may generate a heat map of the one or more hazardous or sub-hazardous readings, and based on determined threshold values associated with an area of the heat map to initiate one or more of dispatch maintenance and service workers to identify and address a cause of the one or more hazardous or sub-hazardous readings; and monitor locations and/or vectors of a plurality of detection systems, and to identify users of such detection systems as such users move within a determined distance of the area of the heat map. In response, the system may cause a change an operation associated with the cause of the one or more hazardous or sub-hazardous readings; and alert such users that a possibility of a hazardous condition exists; and monitor such user's vital signs for a change that could indicate distress of such individual; and dispatch emergency medical and/or hazardous material teams to a location of such users.

A suitable change in operation may include, for example, switching a lock condition of a door that leads to or from a location corresponding to the area of the heat map; initiating a ventilation system to seal or ventilate the location; and de-energizing a circuit in the location. For example, if a user device has a voltage sensor that detects a proximate high-voltage source, the communication device may signal to all high voltage machines proximate to the user's location to de-energize. If the user is anticipating working close to live high voltage sources, the user device can be set to de-energize the high voltage source if the user's heart rate moves to an abnormal state while the location indicates proximity to a high voltage source. A distress alert may be triggered to summon medical assistance, while providing the location of the potentially injured user. In one embodiment, the sensing first circuit can detect one or more hazardous readings, and the communication device is configured to transmit those readings, and additional information, to the backend system. The additional information includes at least the location of the one or more hazardous readings and vital signs of a user of the detection system, wherein a change in the vital signs that could indicate distress of such individual initiates a request for aid for such user to be dispatch to the user location.

FIG. 3 may be a schematic diagram of a glove 300 that supports or includes the alert device. The glove may be sized and shaped to be worn on a hand of a user. Alternatively, it may be of a large size and may be adjustable to fit different hand sizes. A loop antenna 302, may be embedded in the glove. In one embodiment, it may extend through at least one finger 304 of glove.

The glove may include a pouch or pocket 306 that may be sized to receive an energized electrical communication device (EEAD) 308. The EEAD may include signal processing circuitry, a controller, a communication device, and/or an interference reduction device. A suitable communication device may be an LED 310 (e.g., by generating visual signals). If desired, the communication device may be multi-functional, such as, for example, it may be used also to indicate a charge status of a battery, or a power level of the EEAD, or a strength of the detected parameter, or a health check for the device's capabilities. The pocket may include a connector 312 that communicatively couples the loop antenna to the EEAD while it is inserted into the pocket. Because the EEAD may be removable from the pocket, the EEAD can be removed and inserted into another glove or item of equipment. The EEAD may be used with different types of gloves selected for use in different applications.

Figure 4:
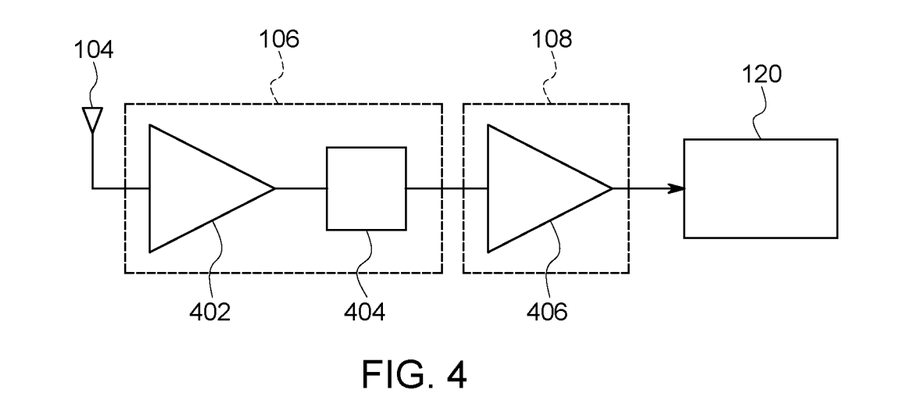
FIG. 4 is a schematic diagram of one embodiment of an antenna, signal processing circuitry, microprocessor, and alert device that may be used with the voltage detection device shown in FIG. 1.

FIG. 4 is a diagram that shows a system with an antenna, signal processing circuitry, a controller, and a communication device to be similar to the device shown in FIG. 1. In the illustrated embodiment, the signal processing circuitry may include an amplifier 402 and a filter 404. The amplifier amplifies the signal received from the antenna to increase sensitivity (e.g., to detect relatively low voltage signals). Further, the filter filters the amplified signal. The filter may filter out signal components outside of a determined frequency range.

The controller may include a threshold value detector 406. The threshold value detector compares the processed signal to a determined threshold value (e.g., a threshold voltage value), and thereby to detects the presence of an active voltage source when the processed signal exceeds the determined threshold value. A determined threshold value may be defined and stored, for example, in the memory device. Upon detecting an active voltage source greater than the threshold value, the controller may instruct the communication device to generate a signal.

Figure 5:
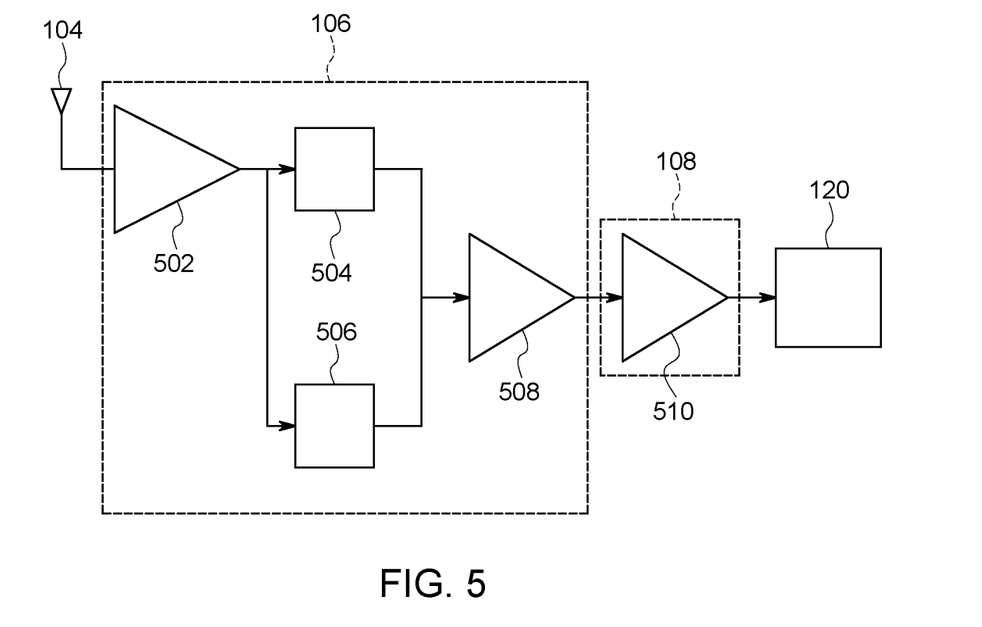
FIG. 5 is a schematic diagram of an alternative embodiment of an antenna, signal processing circuitry, microprocessor, and alert device that may be used with the voltage detection device shown in FIG. 1.

FIG. 5 is a schematic diagram of an embodiment having an antenna, signal processing circuitry, a controller, and a communication device to be similar to the device shown in FIGS. 1 and 4. The signal processing circuitry may include an amplifier 502 that amplifies the signal received from the antenna to increase sensitivity (e.g., to detect relatively low voltage signals). The signal processing circuitry may include a first filter 504 and a second filter 506 coupled in parallel to an output of the amplifier. First and second filters filter the amplified signal. For example, the first filter may be a 60 Hz notch filter, and the second filter may be a broadband filter. To minimize false alarms, the outputs of first and second filters may be combined by a signal combiner 508. A threshold value detector 510 of the controller compares the output of signal combiner signal to a determined threshold value (e.g., a threshold voltage value), and detects the presence of an active AC voltage source when the processed signal exceeds the determined threshold value. The determined threshold value may be defined and stored, for example, in the memory device. Upon detecting an active voltage source, the controller instructs the communication device to generate a signal. The signal may be binary, on/off, or may be graduated such that a stronger input (nearer a voltage source) may generate a proportionally stronger output signal.

Figure 6:
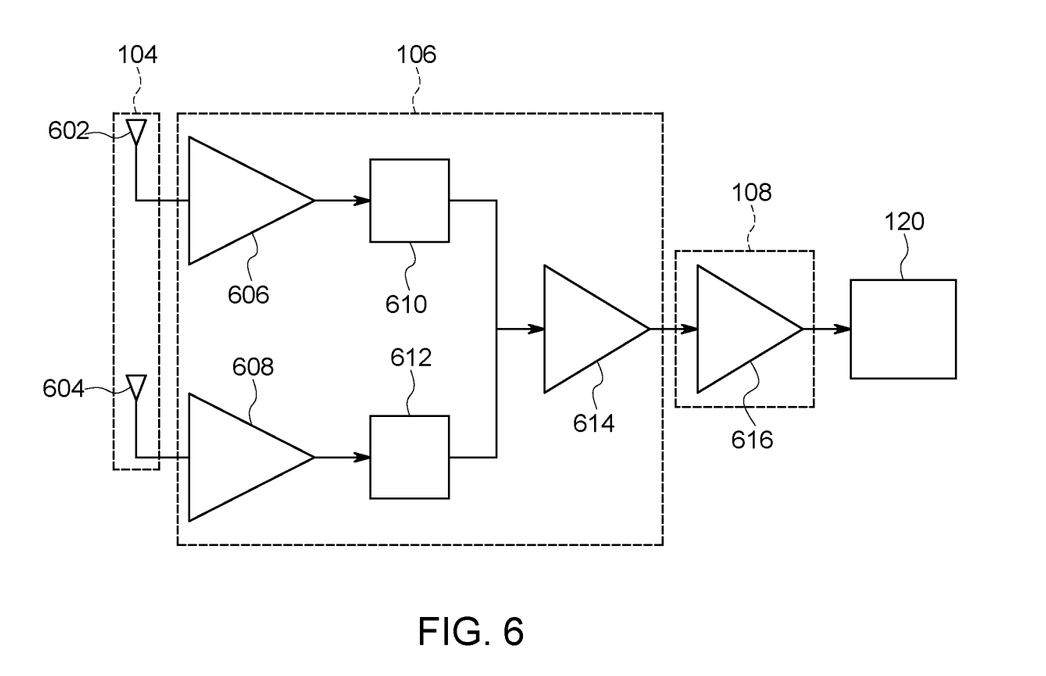
FIG. 6 is a schematic diagram of an alternative embodiment of an antenna, signal processing circuitry, microprocessor, and alert device that may be used with the voltage detection device shown in FIG. 1.

In the embodiment shown in FIG. 6, the antenna may include a first antenna 602 and a second antenna 604. Using multiple antennas facilitates localizing a detected electric field. This may be done to minimize spurious detections from other power sources that the active AC voltage sources. For example, in this embodiment, the first antenna has a first orientation, and the second antenna has a second orientation substantially orthogonal to the first orientation. Other orientations, such as skew, may be used in suitable applications.

As shown in FIG. 6, signal processing circuitry may include a first antenna 602 and a second antenna 604. A first amplifier 606 communicatively couples to first antenna and a second amplifier 608 communicatively couples to second antenna. Each of first and second amplifiers may amplify the signal received from the respective antenna to increase sensitivity (e.g., to detect relatively low voltage signals). A first filter 610 and a second filter 612 may be communicatively coupled to first and second amplifiers, respectively.

The outputs of first and second filters may be combined by a signal combiner 614. A threshold value detector 616 of the controller compares the output of the signal combiner signal to a determined threshold value (e.g., a threshold voltage value), and detects the presence of an active AC voltage source when the processed signal exceeds the determined threshold value. The determined threshold value may be defined and stored, for example, in the memory device. Upon detecting an active voltage source, the controller may instruct the communication device to generate a signal.

Figure 7:
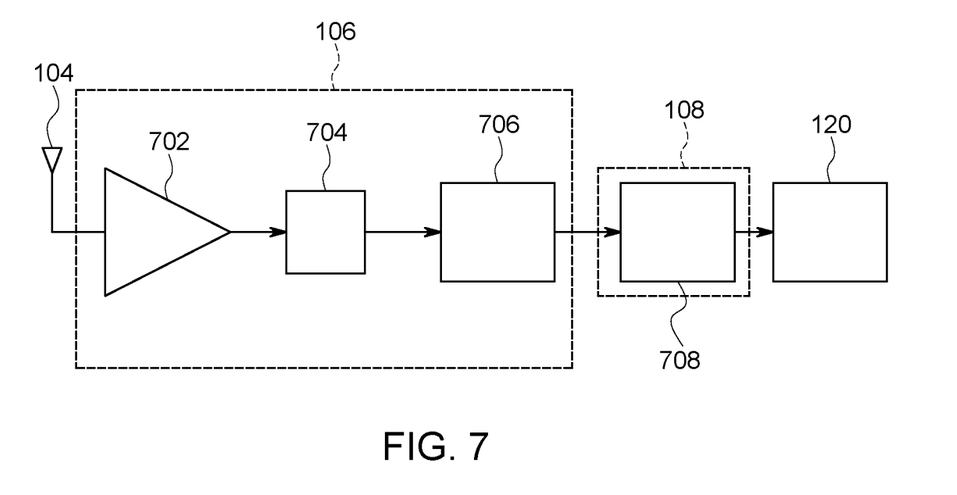
FIG. 7 is a schematic diagram of an alternative embodiment of an antenna, signal processing circuitry, microprocessor, and alert device that may be used with the voltage detection device shown in FIG. 1.

In the embodiment shown in FIG. 7, the signal processing circuitry may include an amplifier 702. The amplifier amplifies the signal received from the antenna to increase sensitivity (e.g., to detect relatively low voltage signals). The signal processing circuitry further may include a filter 704 that filters the amplified signal. An analog to digital converter (ADC) 706 digitizes the output of the filter. Accordingly, the controller may include digital circuitry 708 (e.g., digital filters, discriminator, threshold value detector, waveform display) to determine the presence of an active voltage source and instructs the communication device to generate and/or communicate a signal as appropriate. In one embodiment, the filter circuit may be omitted, and filtering may be performed by digital manipulation of the digital circuitry. Digital signal processing allows for the use of various processing algorithms. In one embodiment, the signal is processed by different signal bands, dynamic threshold values are generated, and/or sensitivity to rate of change in a detected electromagnetic field may be controlled.

Figure 8:
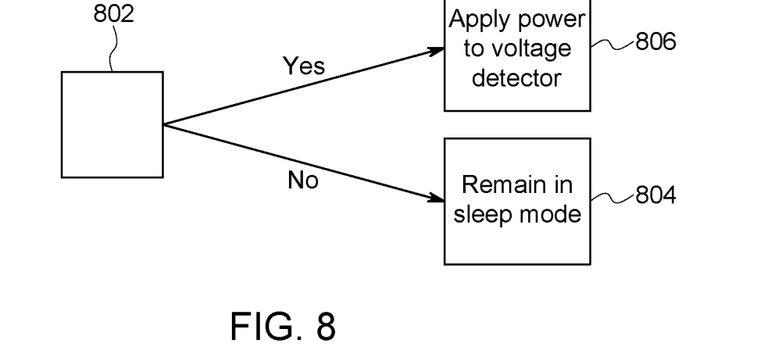
FIG. 8 is a block diagram illustrating operation of a motion or contact sensor that may be used with the voltage detection device shown in FIG. 1.

With reference to FIG. 8, the alert device may include at least one motion or contact sensor that automatically detects that a user may be wearing the alert device, and activates alert device (e.g., by activating the controller) accordingly. The alert device may include a voltage generator capable of generating a small voltage calibration signal to test operation/adjust sensitivity of the alert device. In another embodiment, the alert device may include an energy source. Suitable energy sources may include an energy harvester (e.g., a piezoelectric device) that charges a battery of the alert device from motion and/or exposure to electric fields.

The alert device may include at least one motion or contact sensor that automatically detects that a user may be wearing the alert device, and activates alert device (e.g., by activating the controller) accordingly. A use or wear sensor 802 may determine that a user is (or is not) wearing the alert device or that the device is in use.

In the illustrated embodiment, the wear sensor may be an accelerometer that detects movement of the alert device (which may be indicative of a user wearing the alert device). In another embodiment, the wear sensor may be a contact or touch sensor that detects contact with the skin of a user (which may be indicative of a user wearing the alert device). Other suitable wear sensors may include one or more force sensors, temperature sensors, chemical and/or gas sensors, optical sensors (e.g., camera and/or fiber optic), impedance and/or resistance sensors, acoustic sensors (i.e., microphone), and may be selected based on application specific criteria. As examples, a force sensor may be pressed or activated when the device is being worn. An impedance sensor may detect contact with skin. An acoustic sensor may be voice-activated or may detect the sound of breathing or a heartbeat. A fiber optic may be a fiber that is stressed (optically detectable stressing) in response to being wrapped around a wrist, or by pressure placed on the sole of a shoe, for example. In one example, the wear sensor may function as a health monitor of the user. An accelerometer may detect sharp or sudden impact and may sense orientation (i.e., if the user is upright or prone).

A suitable portable camera unit may be an Internet protocol camera unit, such as a camera that can send video data wirelessly to a network or to a data storage device. In one aspect, the camera can be a digital camera capable of obtaining relatively high-quality image data (e.g., static or still images and/or videos). For example, the camera may be an Internet protocol (IP) camera that generates packetized image data. The camera can be a high definition (HD) camera capable of obtaining image data at relatively high resolutions. For example, the camera may obtain image data having at least 480 horizontal scan lines, at least 576 horizontal scan lines, at least 720 horizontal scan lines, at least 1080 horizontal scan lines, or an even greater resolution. Alternatively, the camera may be another type of camera.

The data storage device may be communicatively coupled to, e.g., electrically connected, the camera unit to store the image data. The data storage device may include one or more computer hard disk drives, removable drives, magnetic drives, read only memories, random access memories, flash drives or other solid-state storage devices, or the like. Optionally, the data storage device may be disposed remote from the camera unit, such as by being separated from the camera unit by at least several centimeters, meters, kilometers, as determined at least in part by the application at hand.

The use of the wear sensor may increase battery life and minimizing power consumption of the alert device. In the exemplary embodiment, the wear sensor continuously or periodically determines whether motion or contact may be detected. If wear sensor does not detect motion or contact, one or more components of the alert device (e.g., the signal processing circuitry, the controller, and/or the communication device) remain 804 in a sleep mode, or low-power consumption mode. When the wear sensor does detect motion or contact, the one or more components may be activated (i.e., by applying power 806 to those components) such that the alert device can readily detect active AC voltage sources. Further, if wear sensor does not detect motion or contact for a determined period of time after activating the one or more components, the alert device returns to the low-power mode.

One or more additional embodiments described herein relate to video units for capturing and communicating video data in a transportation system or network. For example, a camera unit may be deployed onboard a rail vehicle or other vehicle, and then carried by an operator of the vehicle (e.g., when performing work on the vehicle, inspecting the vehicle or the environs of the vehicle, or the like) to capture video data of the vehicle or its environs, for storage for later use, or for displaying or other use on board the vehicle. Optionally, the camera unit may be coupleable to a powered camera supporting object, such that the camera may be mobile. That is, the camera unit and its supporting object may capable of moving independent or separate from movement of the operator or its base vehicle. For example, the camera unit may be connected or otherwise disposed onboard an aerial device (e.g., a drone, helicopter, or airplane) to allow the camera unit to fly, the camera unit may be connected with or otherwise disposed onboard another ground or aquatic mobile system (e.g., a robot or remote control vehicle) to allow the robot and camera to move relative to the vehicle, or the like.

In one embodiment, the camera supporting object is a first ground vehicle capable of at least one of remote control or autonomous movement relative to a second ground vehicle along a route for the second vehicle. The first ground vehicle is intended to travel along the route ahead of the second vehicle and to transmit the image data back to the second ground vehicle. This may provide an operator of the second vehicle a view of the route well in advance of the arrival of the second vehicle. For very high speed second vehicles, the stopping distance may be beyond the visibility provided from the vantage of the second vehicle. The view from the first vehicle, then, may extend or supplement that visible range. In addition, the camera itself may be repositionable and may have the ability to pan left, right, up and down, as well as the ability to zoom in and out.

As used herein, a camera unit or camera is a device for capturing and/or recording visual images. These images may be in the form of still shots, analog video signals, or digital video signals. The signals, particularly the digital video signals, may be subject to compression/decompression algorithms, such as MPEG or HEVC, for example. A suitable camera may capture and record in a determined band of wavelengths of light or energy. For example, in one embodiment the camera may sense wavelengths in the visible spectrum and in another the camera may sense wavelengths in the infrared spectrum. Multiple sensors may be combined in a single camera and may be used selectively based on the application. Further, stereoscopic and 3D cameras are contemplated for at least some embodiments described herein. These cameras may assist in determining distance, velocity, and vectors to predict (and thereby avoid) collision and damage. The term consist, or vehicle consist, refers to two or more vehicles or items of mobile equipment that are mechanically or logically coupled to each other. By logically coupled, the plural items of mobile equipment are controlled so that controls to move one of the items causes a corresponding movement in the other items in consist, such as by wireless command. An Ethernet over multiple unit (eMU) system may include, for example, a communication system for use transmitting data from one vehicle to another in consist (e.g., an Ethernet network over which data is communicated between two or more vehicles).

Figure 9:
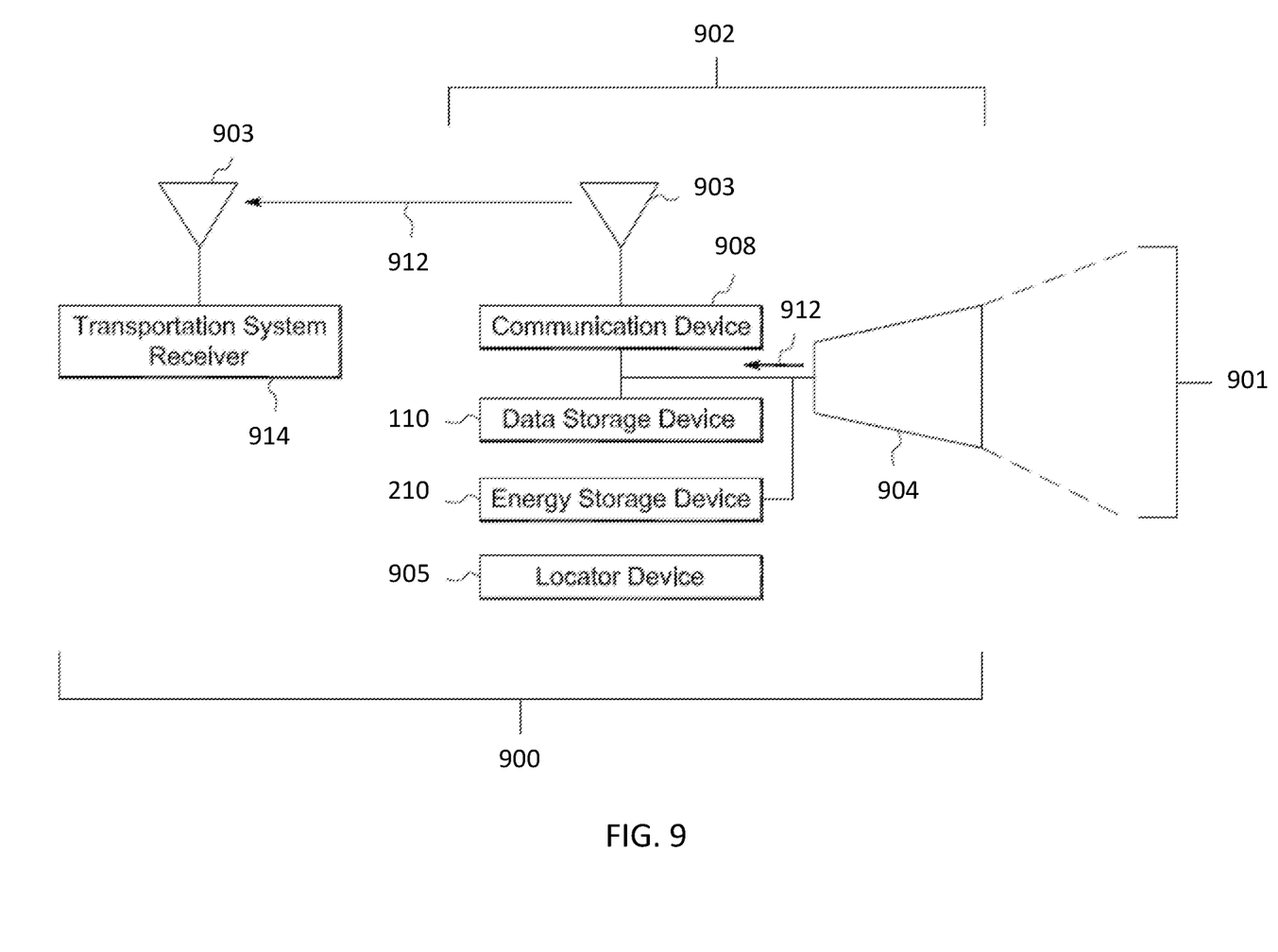
FIG. 9 is a block diagram illustrating a camera system, according to an embodiment.

FIG. 9 illustrates a camera system 900 for capturing and communicating transportation data related to vehicles or otherwise to a transportation system according to one embodiment. The system includes a portable camera unit 902 having a camera 904, the memory storage device 110 and/or a communication device 908, and a battery or other energy storage device 210. The camera unit 902 can represent one or more of the sensors described above.

The camera unit may be portable in that the camera unit is small and/or light enough to be carried by a single adult human. The camera unit is configured to capture and/or generate image data 912 of a field of view 901 of the camera unit. For example, the field of view may represent the solid angle through which the camera unit is sensitive to light, electromagnetic radiation, or other energy that is used to form images, videos, or the like. The image data can include still images, videos (e.g., moving images or a series of images representative of a moving object), or the like, of one or more objects within the field of view of the camera unit. In any of the embodiments of any of the camera systems described herein, data other than image data may be captured and communicated, e.g., the portable camera unit may have a microphone for capturing audio data, a vibration sensor for capturing vibration data, and so on.

A suitable portable camera unit may be an Internet protocol camera unit, such as a camera that can send video data via the Internet or another network. In one aspect, the camera can be a digital camera capable of obtaining relatively high-quality image data (e.g., static or still images and/or videos). For example, the camera may be Internet protocol (IP) cameras that generate packetized image data. The camera can be a high definition (HD) camera capable of obtaining image data at relatively high resolutions. For example, the camera may obtain image data having at least 480 horizontal scan lines, at least 576 horizontal scan lines, at least 720 horizontal scan lines, at least 1080 horizontal scan lines, or an even greater resolution. Alternatively, the camera may be another type of camera.

The data storage device may be electrically connected to the camera unit and configured to store the image data. The data storage device may include one or more computer hard disk drives, removable drives, magnetic drives, read only memories, random access memories, flash drives or other solid-state storage devices, or the like. Optionally, the data storage device may be disposed remote from the camera unit, such as by being separated from the camera unit by at least several centimeters, meters, kilometers, as determined at least in part by the application at hand.

The communication device may be electrically connected to the camera unit and configured to wirelessly communicate (e.g., transmit, broadcast, or the like) the image data to a transportation system receiver 914 located off-board the camera unit. Optionally, the image data may be communicated to the receiver via one or more wired connections, over power lines, through other data storage devices, or the like. The communication device and/or receiver can represent hardware circuits or circuitry, such as transceiving circuitry and associated hardware (e.g., antennas) 903, that include and/or are connected with one or more processors (e.g., microprocessors, controllers, or the like).

The energy storage device may be electrically connected to the camera unit, the data storage device, and/or the communication device. The energy storage device can represent one or more devices that store and/or generate electric current to power the camera unit, the data storage device, and/or the communication device. For example, the energy storage device can include one or more batteries, pantographs (e.g., that receive current from an off-board source via a catenary or overhead line), conductive shoes (e.g., that contact a conductive body, such as an electrified rail, to receive current from an off-board source), generators, alternators, or the like.

In one embodiment, the camera unit comprises the camera, the data storage device, and the energy storage device, but not the communication device. In such an embodiment, the camera unit may be used for storing captured image data for later retrieval and use. In another embodiment, the camera unit comprises the camera, the communication device, and the energy storage device, but not the data storage device. In such an embodiment, the portable camera unit may be used to communicate the image data to a vehicle or other location for immediate use (e.g., being displayed on a display screen), and/or for storage remote from the portable camera unit (this is, for storage not within the portable camera unit). In another embodiment, the camera unit comprises the camera, the communication device, the data storage device, and the energy storage device. In such an embodiment, the portable camera unit may have multiple modes of operation, such as a first mode of operation where image data is stored within the portable camera unit on the data storage device 110, and a second mode of operation where the image data is transmitted off the portable camera unit for remote storage and/or immediate use elsewhere.

The camera may be a digital video camera, such as a camera having a lens, an electronic sensor for converting light that passes through the lens into electronic signals, and a controller for converting the electronic signals output by the electronic sensor into the image data, which may be formatted according to a standard such as MP4. The data storage device, if present, may be a hard disc drive, flash memory (electronic non-volatile non-transitory computer storage medium), or the like. The communication device, if present, may be a wireless local area network (LAN) transmitter (e.g., Wi-Fi transmitter), a radio frequency (RF) transmitter that transmits in and according to one or more commercial cell frequencies/protocols (e.g., 3G or 4G), and/or an RF transmitter that is configured to wirelessly communicate at frequencies used for vehicle communications (e.g., at a frequency compatible with a wireless receiver of a distributed power system of a rail vehicle; distributed power refers to coordinated traction control, such as throttle and braking, of a train or other rail vehicle consist having plural locomotives or other powered rail vehicle units). A suitable energy storage device may be a rechargeable lithium-ion battery, a rechargeable Ni-Mh battery, an alkaline cell, or other device configured for portable energy storage for use in an electronic device. Another suitable energy storage device, albeit more of an energy provider than storage, include a vibration harvester and a solar panel, where energy is generated and then provided to the camera system.

The camera unit can include a locator device or location sensor 905 that generates data used to determine the location of the camera unit. The locator device 905 can represent one or more hardware circuits or circuitry that include and/or are connected with one or more processors (e.g., controllers, microprocessors, or other electronic logic-based devices). In one example, the locator device 905 represents a global positioning system (GPS) receiver that determines a location of the camera unit, a beacon or other communication device that broadcasts or transmits a signal that is received by another component (e.g., the transportation system receiver) to determine how far the camera unit is from the component that receives the signal (e.g., the receiver), a radio frequency identification (RFID) tag or reader that emits and/or receives electromagnetic radiation to determine how far the camera unit is from another RFID reader or tag (e.g., the receiver), or the like. The receiver can receive signals from the locator device 905 to determine the location of the locator device 905 relative to the receiver and/or another location (e.g., relative to a vehicle or vehicle system). Additionally or alternatively, the locator device 905 can receive signals from the receiver (e.g., which may include a transceiver capable of transmitting and/or broadcasting signals) to determine the location of the locator device 905 relative to the receiver and/or another location (e.g., relative to a vehicle or vehicle system).

Figure 10:
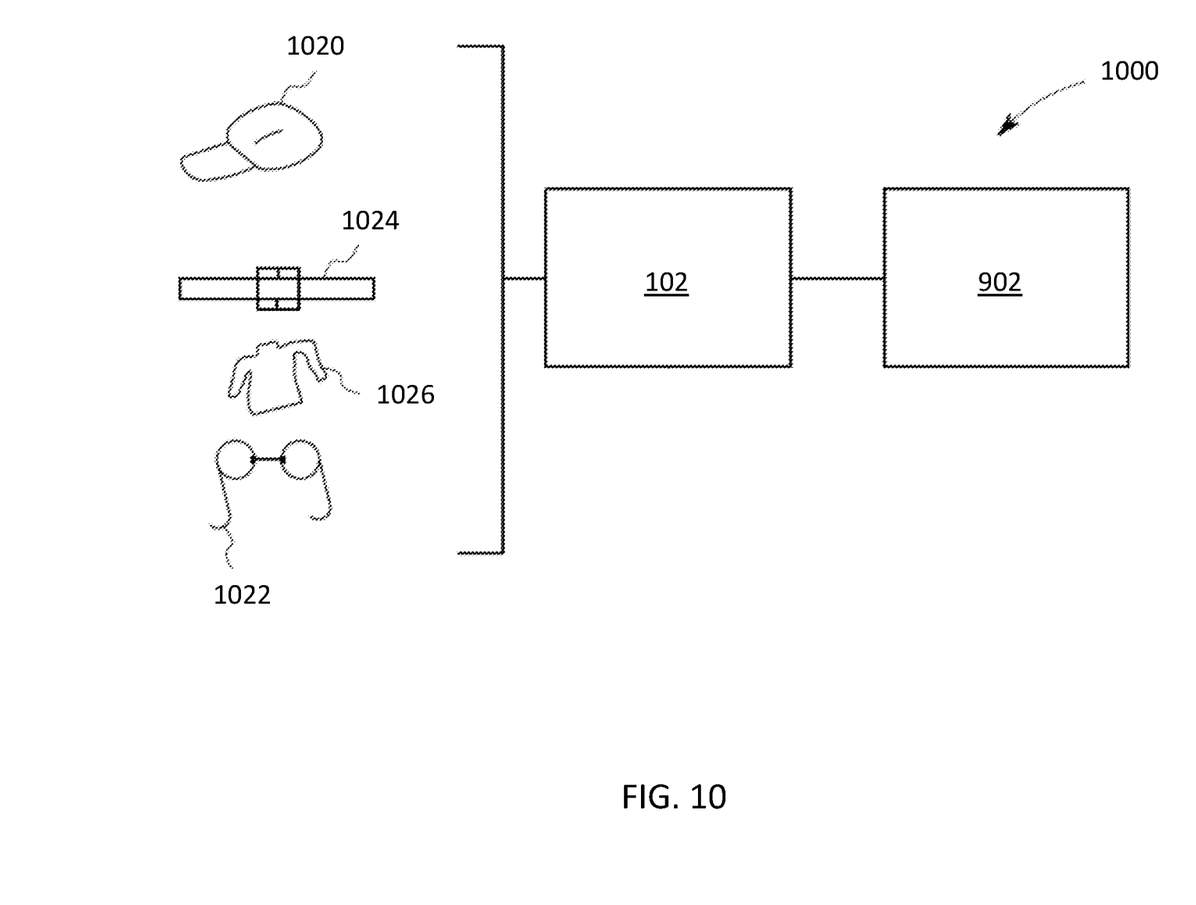
FIG. 10 is a block diagram illustrating another embodiment of a camera system.

FIG. 10 illustrates a camera system 1000 according to another embodiment. The system 1000 includes a garment 1016 configured to be worn or carried by an operator 118, such as a vehicle operator, transportation worker, or other person. The garment 1016 may form or be a wristband (as shown in FIG. 2) or a glove (as shown in FIG. 3). Other suitable configurations for the garment may include a modular design (not shown) that is attachable to a variety of gear having a fastener that accepts the form and fit of the housing. In some applications, the fastener may simply be a Velcro-like system. In other applications, the garment may be securable with a lanyard, a clip, or in a pocket. In one embodiment, the garment may be water-resistant and/or submersible.

The portable camera unit can be attached to the garment. For example, the garment may be a hat 1020 (including a garment worn about the head), an ocular device 1022 (e.g., a Google Glass™ device or other eyepiece), a belt or watch 1024, part of a jacket 1026 or other outer clothing, a clipboard, or the like. The camera unit may detachably connected to the garment, or, in other embodiments, the portable camera unit may be integrated into, or otherwise permanently connected to the garment. Attaching the portable camera unit to the garment can allow the portable camera unit to be worn by a human operator of a vehicle (or the human operator may be otherwise associated with a transportation system), for capturing image data associated with the human operator performing one or more functions with respect to the vehicle or transportation system more generally.

For example, in one embodiment, the portable camera unit includes the communication device, which can be configured to wirelessly communicate the image data to the transportation system receiver. The transportation system receiver can be located onboard a vehicle, at a wayside location of a route of the vehicle, or otherwise remote from the vehicle. Remote generally refers to not onboard the vehicle, and in embodiments, more specifically, to not within the immediate vicinity of the vehicle, such as not within a WiFi and/or cellular range of the vehicle. In one aspect, the camera unit can be fixed to the garment being worn by an operator of the vehicle and provide image data representative of areas around the operator. For example, the image data may represent the areas being viewed by the operator. The image data may no longer be generated by the camera unit during time periods that the operator is within the vehicle or within a designated distance from the vehicle. Upon exiting the vehicle or moving farther than the designated distance (e.g., five meters) from the vehicle, the camera unit may begin automatically generating and/or storing the image data. As described herein, the image data may be communicated to a display onboard the vehicle or in another location so that another operator onboard the vehicle can determine the location of the operator with the camera unit based on the image data. With respect to rail vehicles, one such instance could be an operator exiting the cab of a locomotive. If the operator is going to switch out cars from a rail vehicle that includes the locomotive, the image data obtained by the camera unit on the garment worn by the operator can be recorded and displayed to an engineer onboard the locomotive. The engineer can view the image data as a double check to ensure that the locomotive is not moved if the conductor is between cars of the rail vehicle. Once it is clear from the image data that the conductor is not in the way, then the engineer may control the locomotive to move the rail vehicle. Optionally, the proximity of the garment to an active AC voltage source can be determined (as described above) and the camera unit may begin automatically generating and/or storing the image data.

Optionally, the image data may be autonomously examined by one or more image data analysis systems or image analysis systems described herein. For example, one or more of the transportation receiver system, a vehicle, and/or the camera unit may include an image data analysis system (also referred to as an image analysis system) that examines the image data for one or more purposes described herein.

The embodiments described herein include a wearable alert device that detects proximity to active AC voltage sources and signals a wearer accordingly. The alert device may include a housing, and an antenna, signal processing circuitry, and microprocessor to facilitate detecting active AC voltage sources. The alert device further may include an interference reduction device to reduce electromagnetic interference from sources other than active AC voltage sources. In addition, the alert device leverages particular materials and processing components to reduce or eliminate interference signals, improving the ability of the alert device to detect active AC voltage sources.

An exemplary technical effect of the methods, systems, and apparatus described herein may include at least one of: (a) using non-contact voltage sensing to determine if a user may be near an active AC voltage source; (b) improving sensitivity and reducing false alarms when detecting active AC voltage sources; and (c) improving power management of the alert device to improve battery life.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A detection system comprising:
    a housing configured to be worn by a user or carried on a mobile device;
    at least one sensing circuit selectively coupled to the housing that is configured to sense or detect one or more of electromagnetic radiation, ionizing radiation, a determined liquid analyte, a determined gaseous analyte, a determined powdered analyte concentration, a level of oxygen below a determine threshold value, a data signal strength, a determined level of magnetic flux, a temperature, or a pressure;
    at least one communication device that is configured to one or more of generate or communicate a signal in response to the sensing or detecting by the at least one sensing circuit; and
    an interference circuit configured to reduce or eliminate interference by the sensing circuit, wherein the interference circuit is an interference reduction device embedded in the housing and communicatively coupled to a microprocessor, the interference reduction device configured to discharge an accumulated charge on the detection system to reduce electromagnetic interference from sources other than a proximate active voltage source and the microprocessor is further configured to cause the interference reduction device to discharge the accumulated charge after a determined period.

2. The detection system defined in claim 1, further comprising a locating device configured to determine a location of the housing.

3. The detection system defined in claim 2, wherein the at least one sensing circuit is configured to detect at least the electromagnetic radiation, and the interference circuit is configured to dissipate the accumulated charge on the at least one sensing circuit to reduce or eliminate electromagnetic interference.

4. The detection system defined in claim 3, further comprising an external receiver configured to receive the signal from the at least one communication device and to turn off voltage at a device in response to receiving the signal.

5. The detection system defined in claim 2, further comprising a backend system that is configured to communicate with the at least one communication device and thereby to at least receive the signal.

6. The detection system defined in claim 5, wherein the at least one communication device is further configured to transmit first location information from the locating device to the backend system, and the backend system is configured to perform an analysis of one or more signals generated by the at least one communication device and, based at least in part on the analysis and based at least in part on location information of other users is further configured to warn the other users of their approach to or toward an area where a hazard was indicated by the analysis, wherein the analysis is based at least in part on a combination of the one or more signals and the first location information.

7. The detection system defined in claim 5, wherein the at least one sensing circuit is configured to detect one or more hazardous or sub-hazardous readings, and the at least one communication device is configured to transmit those readings, and additional information, to the backend system; and the backend system stores information regarding the one or more hazardous or sub-hazardous readings, and the additional information includes at least the time and location of the one or more hazardous or sub-hazardous readings.

8. The detection system defined in claim 7, wherein the backend system is configured to dispatch maintenance to an area in response to an indication by the signal that a threshold value of one or more sensed attributes has been achieved or surpassed, and is configured to tailor the maintenance that is dispatched to the area based at least in part on the hazardous or sub-hazardous readings that were detected.

9. The detection system defined in claim 7, wherein the at least one sensing circuit is configured to detect the one or more hazardous readings, and the at least one communication device is configured to transmit those readings, and the additional information, to the backend system, and the additional information includes at least the location of the one or more hazardous readings and one or more vital signs of a user of the detection system, wherein a change in the vital signs that could indicate distress of such individual initiates a request for aid for such user to be dispatched to the location.

10. The detection system defined in claim 7, wherein the backend system is configured to monitor location information of a plurality of users, and to predict location movement of users to determine if any of the users are heading towards an area with identified hazardous or sub-hazardous readings.

11. The detection system defined in claim 7, wherein the backend system is configured to generate a heat map of the one or more hazardous or sub-hazardous readings, and based on determined threshold values associated with an area of the heat map to initiate one or more of:

dispatch maintenance to identify and address a cause of the one or more hazardous or sub-hazardous readings; and monitor locations and/or vectors of a plurality of detection systems, and to identify users of such detection systems as such users move within a determined distance of the area of the heat map, and one or more of:

change an operation associated with the cause of the one or more hazardous or sub-hazardous readings;

alert such users that a possibility of a hazardous condition exists;

monitor such user's vital signs for a change that could indicate distress of such individual; or dispatch emergency medical and/or hazardous material teams to a location of such users.

12. The detection system defined in claim 11, wherein the backend system is configured to change the operation associated with the cause of the one or more hazardous or sub-hazardous readings, and wherein the change in operation comprises one or more of:

switching a lock condition of a door that leads to or from a location corresponding to the area of the heat map;

initiating a ventilation system to seal the location;

initiating the ventilation system to ventilate the location;

de-energizing a circuit in the location; or initiating a fire suppression system at the location.

13. The detection system defined in claim 1, wherein the interference circuit comprises an electrically dissipative material.

14. The detection system defined in claim 1, wherein the interference reduction device is configured to discharge the accumulated charge on the detection system to reduce electromagnetic interference generated by the at least one communication device.

15. The detection system defined in claim 1, wherein the at least one sensing circuit has a substantially omnidirectional angular range.

16. The detection system defined in claim 1, further comprising an accelerometer embedded in the housing and communicatively coupled to the microprocessor, the accelerometer configured to:

detect movement of the detection system; and selectively activate the microprocessor based on the detected movement.

17. A method, comprising:

collecting with the detection system according to claim 1 the one or more hazardous or sub-hazardous readings;

comparing the one or more hazardous or sub-hazardous readings to an associated set of determined threshold values, and responding to the one or more hazardous or sub-hazardous readings exceeding at least one of the determined threshold values by:

dispatching maintenance to a location where the one or more hazardous or sub-hazardous readings were generated to identify and address a cause of the one or more hazardous or sub-hazardous readings;

generating a heat map of the one or more hazardous or sub-hazardous readings; and monitoring locations and/or vectors of a plurality of users, if any one of such plurality of users moves within a determined distance of the one or more hazardous or sub-hazardous readings, wherein the method further comprises one or more of:

dispatching emergency medical and/or hazardous material teams to a location of such users;

alerting such users that a possibility of a hazardous condition exists;

monitoring such user's vital signs for a change that could indicate distress of such individual; or changing an operation associated with the cause of the one or more hazardous or sub-hazardous readings, wherein changing the operation comprises one or more of:

switching a lock condition of a door that leads to or from a location corresponding to an area of the heat map;

initiating a ventilation system to seal the location;

initiating the ventilation system to ventilate the location;

de-energizing a circuit in the location; or initiating a fire suppression system at the location.

18. The method as defined in claim 17, wherein the one or more hazardous or sub-hazardous readings comprises detecting proximity of a high voltage source, and further comprising discharging a static charge on the detection system for detecting the proximity of the high voltage source.

* * * * *